(12) United States Patent
Ranjan et al.

(10) Patent No.: US 10,584,906 B2
(45) Date of Patent: Mar. 10, 2020

(54) REFRIGERATION PURGE SYSTEM

(71) Applicant: Carrier Corporation, Jupiter, FL (US)

(72) Inventors: Rajiv Ranjan, South Windsor, CT (US); Haralambos Cordatos, Colchester, CT (US); Zissis A. Dardas, Worcester, MA (US); Georgios S. Zafiris, Glastonbury, CT (US); Yinshan Feng, Manchester, CT (US); Parmesh Verma, South Windsor, CT (US); Michael A. Stark, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 117 days.

(21) Appl. No.: 15/808,837

(22) Filed: Nov. 9, 2017

(65) Prior Publication Data

US 2018/0066880 A1    Mar. 8, 2018

Related U.S. Application Data

(63) Continuation-in-part of application No. 14/909,542, filed as application No. PCT/US2014/040795 on Jun. 4, 2014, now Pat. No. 9,987,568.
(Continued)

(51) Int. Cl.
F25B 43/04    (2006.01)
F25B 43/00    (2006.01)
(Continued)

(52) U.S. Cl.
CPC ........ *F25B 43/043* (2013.01); *B01D 19/0031* (2013.01); *B01D 53/22* (2013.01); *F25B 43/003* (2013.01); *B01D 2311/103* (2013.01)

(58) Field of Classification Search
CPC ............ B01D 19/0031; B01D 19/0063; B01D 53/22; B01D 2311/13; B01D 2311/103;
(Continued)

(56) References Cited

U.S. PATENT DOCUMENTS 2,044,166 A    6/1936   Hayden
4,304,102 A    12/1981  Gray
(Continued)

FOREIGN PATENT DOCUMENTS

CN    1791774 A      6/2006
CN    101373111 A    2/2009
(Continued)

OTHER PUBLICATIONS

European Search Report dated Mar. 14, 2019 cited in Application No. 18205247.2, 7 pgs.
(Continued)

*Primary Examiner* — Jason M Greene
(74) *Attorney, Agent, or Firm* — Cantor Colburn LLP

(57) ABSTRACT

Disclosed is a refrigeration system including a heat transfer fluid circulation loop configured to allow a refrigerant to circulate therethrough. A purge gas outlet is in operable communication with the heat transfer fluid circulation loop. The system also includes at least one gas permeable membrane having a first side in operable communication with the purge gas outlet and a second side. The membrane includes a porous inorganic material with pores of a size to allow passage of contaminants through the membrane and restrict passage of the refrigerant through the membrane. The system also includes a permeate outlet in operable communication with a second side of the membrane.

18 Claims, 5 Drawing Sheets

Related U.S. Application Data

(60) Provisional application No. 61/864,133, filed on Aug. 9, 2013.

(51) Int. Cl.
  *B01D 19/00* (2006.01)
  *B01D 53/22* (2006.01)

(58) Field of Classification Search
  CPC ...... F25B 43/003; F25B 43/04; F25B 43/043; F25B 47/00
  See application file for complete search history.

(56) References Cited

U.S. PATENT DOCUMENTS

| | | | |
|---|---|---|---|
| 4,316,364 A | 2/1982 | Spauschus | |
| 4,417,451 A | 11/1983 | Spauschus | |
| 4,906,256 A | 3/1990 | Baker et al. | |
| 4,984,431 A | 1/1991 | Mount et al. | |
| 5,032,148 A | 7/1991 | Baker et al. | |
| 5,044,166 A * | 9/1991 | Wijmans | B01D 53/22 62/475 |
| 5,062,273 A * | 11/1991 | Lee | F25B 43/043 62/475 |
| 5,071,451 A | 12/1991 | Wijmans | |
| 5,089,033 A | 2/1992 | Wijmans | |
| 5,429,662 A | 7/1995 | Fillet | |
| 5,718,119 A | 2/1998 | Wakita et al. | |
| 5,858,065 A | 1/1999 | Li et al. | |
| 6,128,916 A | 10/2000 | Callahan et al. | |
| 6,925,821 B2 | 8/2005 | Sienel | |
| 7,188,480 B2 | 3/2007 | Korin | |
| 7,282,148 B2 | 10/2007 | Dalton et al. | |
| 7,357,002 B2 | 4/2008 | Yoshimi et al. | |
| 8,216,473 B2 | 7/2012 | Wohlert | |
| 8,361,197 B2 | 1/2013 | Kawai et al. | |
| 9,073,808 B1 | 7/2015 | Su et al. | |
| 2007/0101759 A1 | 5/2007 | Matsuoka et al. | |
| 2007/0113581 A1* | 5/2007 | Yoshimi | F25B 43/043 62/475 |
| 2007/0193285 A1 | 8/2007 | Knight et al. | |
| 2008/0202152 A1 | 8/2008 | Munoz et al. | |
| 2008/0202153 A1 | 8/2008 | Watanabe | |
| 2008/0217247 A1 | 9/2008 | Niino et al. | |
| 2011/0120157 A1 | 5/2011 | Wohlert | |
| 2013/0118198 A1 | 5/2013 | Brown et al. | |
| 2015/0323226 A1 | 11/2015 | Haraki et al. | |
| 2016/0175740 A1 | 6/2016 | Stark et al. | |

FOREIGN PATENT DOCUMENTS

| | | |
|---|---|---|
| CN | 201363956 Y | 12/2009 |
| CN | 201954828 U | 8/2011 |
| EP | 1650509 A1 | 4/2006 |
| EP | 1681523 A1 | 7/2006 |
| JP | H10213363 A | 8/1998 |
| JP | 11248298 | 9/1999 |
| JP | 2005127564 A | 5/2005 |
| JP | 11248298 | 9/2011 |
| JP | 5585307 | 9/2014 |

OTHER PUBLICATIONS

Chinese Office Action and Search Report from Chinese Patent Office for CN Application No. 201480044756.4, dated Apr. 28, 2017, 17 pages, English Translation Included.

Chinese Office Action and Search Report from Chinese Patent Office for CN Application No. 201480044756.4, dated Dec. 14, 2017, 18 pages, English Translation Included.

International Search Report for application PCT/US2014/040795, dated Aug. 29, 2014, 4 pages.

Written Opinion for application PCT/US2014/040795, dated Aug. 29, 2014, 4 pages.

Coronas et al., "Separations Using Zeolite Membranes", Separation and Purification Methods, vol. 28, 1999—Issue 2, Abstract Only, 6 pages.

Rao et al., "Nanoporous carbon membranes for separation of gas mixtures by selective surface flow", Journal of Membrane Science, vol. 85, Issue 3, Dec. 2, 1993, pp. 253-264, Abstract Only, 3 pages.

Battelle Memorial Institute, "Cascade Reverse Osmosis and the Absorption Osmosis Cycle", ARPA-E, http://arpa-e.energy.gov/?q=slick-sheet-project/cascade-reverse-osmosis-air-conditioning-system, release date Jul. 12, 2010, 1 page.

* cited by examiner

REFRIGERATION PURGE SYSTEM

This is a continuation-in-part of U.S. patent application Ser. No. 14/909,542, which is a national stage of PCT/US2014/040795, which claims priority to U.S. application Ser. No. 61/864,133, the disclosures of each of which is incorporated herein by reference in its entirety.

BACKGROUND

This disclosure relates generally to chiller systems used in air conditioning systems, and more particularly to a purge system for removing contaminants from a refrigeration system.

Chiller systems such as those utilizing centrifugal compressors may include sections that operate below atmospheric pressure. As a result, leaks in the chiller system may draw air into the system, contaminating the refrigerant. This contamination degrades the performance of the chiller system. To address this problem, existing low pressure chillers include a purge unit to remove contamination. Existing purge units use a vapor compression cycle to separate contaminant gas from the refrigerant. Existing purge units are complicated and lose refrigerant in the process of removing contamination.

BRIEF DESCRIPTION

Disclosed is a refrigeration system including a heat transfer fluid circulation loop configured to allow a refrigerant to circulate therethrough. A purge gas outlet is in operable communication with the heat transfer fluid circulation loop. The system also includes at least one gas permeable membrane having a first side in operable communication with the purge gas outlet and a second side. The membrane includes a porous inorganic material with pores of a size to allow passage of contaminants through the membrane and restrict passage of the refrigerant through the membrane. The system also includes a permeate outlet in operable communication with a second side of the membrane.

In some embodiments, the system further includes a prime mover operably coupled to the permeate outlet, and the prime mover is configured to move gas from the second side of the membrane to an exhaust port leading outside the fluid circulation loop.

In any one or combination of the foregoing embodiments, the heat transfer fluid circulation loop includes a compressor, a heat rejection heat exchanger, an expansion device, and a heat absorption heat exchanger, connected together in order by conduit, and the purge gas outlet is in operable communication with at least one of the heat rejection heat exchanger, the heat absorption heat exchanger and the membrane.

In any one or combination of the foregoing embodiments, the system further includes a retentate return conduit operably coupling the first side of the membrane to the fluid circulation loop. In some embodiments, the prime mover is a vacuum pump In any one or combination of the foregoing embodiments, the system further includes a purge gas collector operably coupled to the purge outlet and the membrane.

In any one or combination of the foregoing embodiments, the purge gas collector includes purge gas therein comprising refrigerant gas and contaminants, said purge gas in a stratified configuration with a higher concentration of refrigerant toward the purge outlet and a higher concentration of contaminants toward the membrane.

In any one or combination of the foregoing embodiments, the system further includes a chiller coil disposed in the purge gas collector, the coil in operable communication with the fluid circulation loop.

In any one or combination of the foregoing embodiments, the system further includes a heat source, said heat source being in controllable thermal communication with at least one of the membrane and the purge gas collector.

In any one or combination of the foregoing embodiments, the system further includes a heat source in controllable thermal communication with either or both of the membrane or a purge gas collector between the purge outlet and the membrane.

In any one or combination of the foregoing embodiments, the membrane includes a ceramic.

In any one or combination of the foregoing embodiments, the at least one gas permeable membrane includes a plurality of gas permeable membranes; wherein the plurality of gas permeable membranes are arranged in serial or parallel communication.

In any one or combination of the foregoing embodiments, the system further includes a second prime mover conduit to move permeate from the second side of the membrane to the first side of the membrane.

In any one or combination of the foregoing embodiments, the system further includes a filter or a vortex separator between the purge outlet and the membrane.

In any one or combination of the foregoing embodiments, the system further includes a controller configured to operate fluid circulation loop in response to a cooling demand signal and to operate the prime mover in response to a determination of contaminants in the fluid circulation loop.

Also disclosed is a method of operating a refrigeration system, including circulating a refrigerant through a vapor compression heat transfer fluid circulation loop in response to a cooling demand signal. The fluid circulation loop includes a heat rejection side of a first heat exchanger, an expansion device, and the heat absorption side of a second heat exchanger, connected together in order by conduit under conditions in which the refrigerant is at a pressure less than atmospheric pressure in at least a portion of the fluid circulation loop. Purge gas including contaminants is collected from a purge outlet in the fluid circulation loop and transferred across a permeable membrane with a prime mover. The membrane includes a porous inorganic material with pores of a size to allow passage of the contaminants through the membrane and restrict passage of the refrigerant through the membrane.

In some embodiments, the method further includes collecting the purge gas in a purge gas collector between the purge outlet and the membrane.

In any one or combination of the foregoing embodiments, the method includes stratifying purge gas in the purge gas collector with a higher concentration of refrigerant toward the purge outlet and a higher concentration of contaminants toward the membrane.

In any one or combination of the foregoing embodiments, the method further includes returning refrigerant from the first side of the membrane to the fluid circulation loop.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
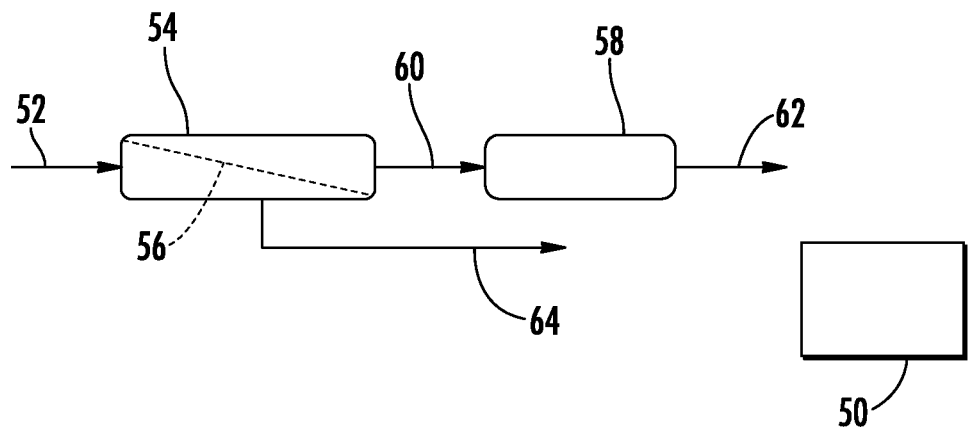
FIG. 1 is a schematic depiction of an example embodiment of a membrane purge system for a refrigeration system.
Figure 2:
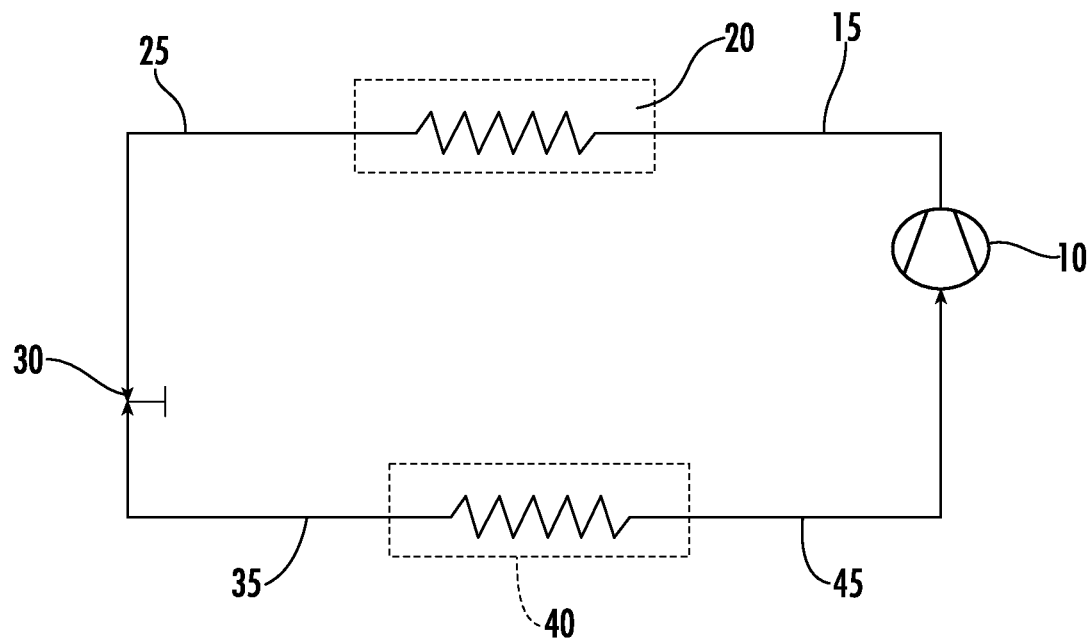
FIG. 2 is a schematic depiction of a refrigeration system including a vapor compression heat transfer refrigerant fluid circulation loop.

With reference now to FIG. 1, there is shown an example embodiment of a purge system that can be connected to a heat transfer fluid circulation loop such as the one shown in FIG. 2. As shown in FIG. 1, the purge system receives gas comprising refrigerant gas and contaminants (e.g., nitrogen, oxygen, or water) from a refrigerant-containing refrigeration system such as shown in FIG. 12 through a purge connection 52 to a membrane separator 54 on a first side of a membrane 56. In some embodiments, the contaminants can comprise a non-condensable gas such as components of atmospheric air (e.g., nitrogen, oxygen). A prime mover such as a vacuum pump 58 connected to the membrane separator 54 through connection 60 provides a driving force to pass the contaminant molecules through the membrane 56 and exit the system from a second side of the membrane 56 through an outlet 58. In some embodiments, the prime mover can be in the fluid loop, e.g., a refrigerant pump or compressor. Refrigerant gas tends to remain on the first side of the membrane 56 and can return to the fluid circulation loop through connection 64. A controller 50, the operation of which is described in more detail below, is in operable communication with the refrigeration system components.

The membrane 56 includes a porous inorganic material. Examples of porous inorganic materials can include ceramics such as metal oxides or metal silicates, more specifically aluminosilicates (e.g., Chabazite Framework (CHA) zeolite, Linde type A (LTA) zeolite, porous carbon, porous glass, clays (e.g., Montmorillonite, Halloysite). Porous inorganic materials can also include porous metals such as platinum and nickel. Hybrid inorganic-organic materials such as a metal organic framework (MOF) can also be used. Other materials can be present in the membrane such as a carrier in which a microporous material can be dispersed, which can be included for structural or process considerations.

Metal organic framework materials are well-known in the art, and comprise metal ions or clusters of metal ions coordinated to organic ligands to form one-, two- or three-dimensional structures. A metal-organic framework can be characterized as a coordination network with organic ligands containing voids. The coordination network can be characterized as a coordination compound extending, through repeating coordination entities, in one dimension, but with cross-links between two or more individual chains, loops, or spiro-links, or a coordination compound extending through repeating coordination entities in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. A wide variety of metals can be included in a metal organic framework. Examples of specific metal organic framework materials include but are not limited to zeolitic imidazole framework (ZIF), HKUST-1.

In some embodiments, pore sizes can be characterized by a pore size distribution with an average pore size from 2.5 Å to 10.0 Å, and a pore size distribution of at least 0.1 Å. In some embodiments, the average pore size for the porous material can be in a range with a lower end of 2.5 Å to 4.0 Å and an upper end of 2.6 Å to 10.0 Å. A. In some embodiments, the average pore size can be in a range having a lower end of 2.5 Å, 3.0 Å, 3.5 Å, and an upper end of 3.5 Å, 5.0 Å, or 6.0 Å. These range endpoints can be independently combined to form a number of different ranges, and all ranges for each possible combination of range endpoints are hereby disclosed. Porosity of the material can be in a range having a lower end of 5%, 10%, or 15%, and an upper end of 85%, 90%, or 95% (percentages by volume). These range endpoints can be independently combined to form a number of different ranges, and all ranges for each possible combination of range endpoints are hereby disclosed.

The above microporous materials can be can be synthesized by hydrothermal or solvothermal techniques (e.g., sol-gel) where crystals are slowly grown from a solution. Templating for the microstructure can be provided by a secondary building unit (SBU) and the organic ligands. Alternate synthesis techniques are also available, such as physical vapor deposition or chemical vapor deposition, in which metal oxide precursor layers are deposited, either as a primary microporous material, or as a precursor to an MOF structure formed by exposure of the precursor layers to sublimed ligand molecules to impart a phase transformation to an MOF crystal lattice.

In some embodiments, the above-described membrane materials can provide a technical effect of promoting separation of contaminants (e.g., nitrogen, oxygen and/or water molecules) from refrigerant gas, which is condensable. Other air-permeable materials, such as porous or non-porous polymers can be subject to solvent interaction with the matrix material, which can interfere with effective separation. In some embodiments, the capabilities of the materials described herein can provide a technical effect of promoting the implementation of a various example embodiments of refrigeration systems with purge, as described in more detail with reference to the example embodiments below.

The membrane material can be self-supporting or it can be supported, for example, as a layer on a porous support or integrated with a matrix support material. In some embodiments, thickness of a support for a supported membrane can range from 50 nm to 1000 nm, more specifically from 100 nm to 750 nm, and even more specifically from 250 nm to 500 nm. In the case of tubular membranes, fiber diameters can range from 100 nm to 2000 nm, and fiber lengths can range from 0.2 m to 2 m.

In some embodiments, the microporous material can be deposited on a support as particles in a powder or dispersed in a liquid carrier using various techniques such as spray coating, dip coating, solution casting, etc. The dispersion can contain various additives, such as dispersing aids, rheology modifiers, etc. Polymeric additives can be used; however, a polymer binder is not needed, although a polymer binder can be included and in some embodiments is included such as with a mixed matrix membrane comprising a microporous inorganic material (e.g., microporous ceramic particles) in an organic (e.g., organic polymer) matrix. However, a polymer binder present in an amount sufficient to form a contiguous polymer phase can provide passageways in the membrane for larger molecules to bypass the molecular sieve particles. Accordingly, in some embodiments a polymer binder is excluded. In other embodiments, a polymer binder can be present in an amount below that needed to form a contiguous polymer phase, such as embodiments in which the membrane is in series with other membranes that may be more restrictive. In some embodiments, particles of the microporous material (e.g., particles with sizes of 0.01 μm to 10 mm, or in some embodiments from 0.5 μm to 10 μm) can be applied as a powder or dispersed in a liquid carrier (e.g., an organic solvent or aqueous liquid carrier) and coated onto the support followed by removal of the liquid. In some embodiments, the application of solid particles of microporous material from a liquid composition to the support surface can be assisted by application of a pressure differential across the support. For example a vacuum can be applied from the opposite side of the support as the liquid composition comprising the solid microporous particles to assist in application of the solid particles to the surface of the support. A coated layer of microporous material can be dried to remove residual solvent and optionally heated to fuse the microporous particles together into a contiguous layer. Various membrane structure configurations can be utilized, including but not limited to flat or planar configurations, tubular configurations, or spiral configurations. In some embodiments, the membrane can include a protective polymer coating or can utilize or can utilize backflow or heating to regenerate the membrane, as disclosed in greater detail in U.S. patent application Ser. No. 15/808,837, entitled "Low Pressure Refrigeration System with Membrane Purge", the disclosure of which is incorporated herein by reference in its entirety.

In some embodiments, the microporous material can be configured as nanoplatelets such as zeolite nanosheets. Zeolite nanosheet particles can have thicknesses ranging from 2 to 50 nm, more specifically 2 to 20 nm, and even more specifically from 2 nm to 10 nm. The mean diameter of the nanosheets can range from 50 nm to 5000 nm, more specifically from 100 nm to 2500 nm, and even more specifically from 100 nm to 1000 nm. Mean diameter of an irregularly-shaped tabular particle can be determined by calculating the diameter of a circular-shaped tabular particle having the same surface area in the x-y direction (i.e., along the tabular planar surface) as the irregularly-shaped particle. Zeolite such as zeolite nanosheets can be formed from any of various zeolite structures, including but not limited to framework type MFI, MWW, FER, LTA, FAU, and mixtures of the preceding with each other or with other zeolite structures. In a more specific group of exemplary embodiments, the zeolite such as zeolite nanosheets can comprise zeolite structures selected from MFI, MWW, FER, LTA framework type. Zeolite nanosheets can be prepared using known techniques such as exfoliation of zeolite crystal structure precursors. For example, MFI and MWW zeolite nanosheets can be prepared by sonicating the layered precursors (multilamellar silicalite-1 and ITQ-1, respectively) in solvent. Prior to sonication, the zeolite layers can optionally be swollen, for example with a combination of base and surfactant, and/or melt-blending with polystyrene. The zeolite layered precursors are typically prepared using conventional techniques for preparation of microporous materials such as sol-gel methods.

The membrane purge shown in FIG. 1 can be used with various types of refrigeration systems. One example system is a vapor compression cycle refrigeration system, an example embodiment of which is shown in FIG. 2. As shown in FIG. 2, a heat transfer fluid circulation loop is shown in block diagram form in FIG. 2. As shown in FIG. 2, a compressor 10 pressurizes heat transfer fluid in its gaseous state, which both heats the fluid and provides pressure to circulate it throughout the system. In some embodiments, the heat transfer fluid, or refrigerant, comprises an organic compound. In some embodiments, the refrigerant comprises a hydrocarbon or substituted hydrocarbon. In some embodiments, the refrigerant comprises a halogen-substituted hydrocarbon. In some embodiments, the refrigerant comprises a fluoro-substituted or chloro-fluoro-substituted hydrocarbon. The hot pressurized gaseous heat transfer fluid exiting from the compressor 10 flows through conduit 15 to a heat rejection heat exchanger such as condenser 20, which functions as a heat exchanger to transfer heat from the heat transfer fluid to the surrounding environment, resulting in condensation of the hot gaseous heat transfer fluid to a pressurized moderate temperature liquid. The liquid heat transfer fluid exiting from the condenser 20 flows through conduit 25 to expansion valve 30, where the pressure is reduced. The reduced pressure liquid heat transfer fluid exiting the expansion valve 30 flows through conduit 35 to a heat absorption heat exchanger such as evaporator 40, which functions as a heat exchanger to absorb heat from the surrounding environment and boil the heat transfer fluid. Gaseous heat transfer fluid exiting the evaporator 40 flows through conduit 45 to the compressor 10, thus completing the heat transfer fluid loop. The heat transfer system has the effect of transferring heat from the environment surrounding the evaporator 40 to the environment surrounding the condenser 20. The thermodynamic properties of the heat transfer fluid must allow it to reach a high enough temperature when compressed so that it is greater than the environment surrounding the condenser 20, allowing heat to be transferred to the surrounding environment. The thermodynamic properties of the heat transfer fluid must also have a boiling point at its post-expansion pressure that allows the temperature surrounding the evaporator 40 to provide heat to vaporize the liquid heat transfer fluid.

Figure 3:
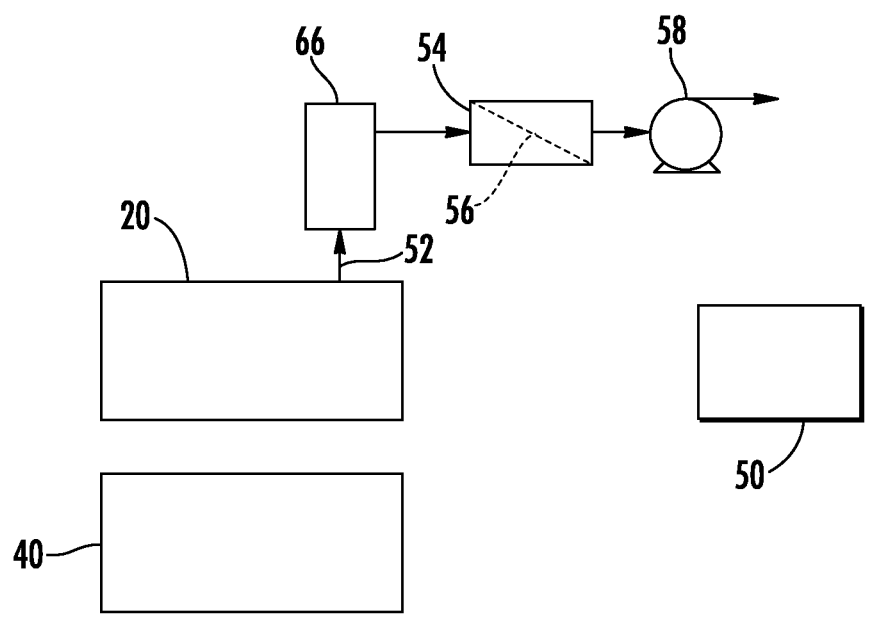
FIG. 3 is schematic depiction of an example embodiment of a membrane purge system with purge collector and relevant components of a vapor compression heat transfer refrigerant fluid circulation loop.

With reference now to FIG. 3, there is shown an example embodiment of a purge system connected to a vapor compression heat transfer fluid circulation loop such as FIG. 2 (not all components of FIG. 2 shown). As shown in FIG. 3, a purge collector 66 receives purge gas including refrigerant gas and contaminants (e.g., nitrogen, oxygen) from a purge connection 52 connected to the condenser 20. The purge gas is directed from the purge collector 66 to a first side of a membrane 56 in a membrane separator 54. In some embodiments, the membrane separator 54 and purge collector 66 can be integrated into a single unit by disposing the membrane 56 at the outlet of the purge collector 66. A prime mover such as a vacuum pump 58 connected to the membrane separator 54 provides a driving force to pass the contaminant gas molecules through the membrane 56 and exit the system from a second side of the membrane 56 through an outlet. A controller 50 receives system data (e.g., pressure, temperature, mass flow rates) and system or operator control (e.g., on/of, receipt of cooling demand signal), and utilizes electronic control components (e.g., a microprocessor) to control system components such as various pumps, valves, switches.

In some embodiments, the connection of the purge connection 52 to the condenser can be made at a high point of the condenser structure. In some embodiments, the purge collector 66 can provide a technical effect of promoting higher concentrations of contaminants at the membrane separator 54, which can promote more effective mass transfer and separation. This effect can occur through a stratification of gas in the purge collector 66 in which lighter contaminants concentrates toward the top of the purge collector 66 and heavier refrigerant gas concentrates toward the bottom of the purge collector 66. In some embodiments, the purge collector 66 can be any kind of vessel or chamber with a volume or cross-sectional open space to provide for collection of purge gas and for a low gas velocity during operation of the purge system vacuum pump 58 to promote stratification. Stratification can also occur at any time when the purge system is not operating (including during operation of the refrigeration system fluid circulation loop), as the purge collector 66 remains in fluid communication with the purge connection 52 with essentially stagnant gas in the purge collector 66. Other embodiments can also be employed to promote higher concentrations of contaminants at the membrane separator 54, as discussed in more detail below.

Figure 4:
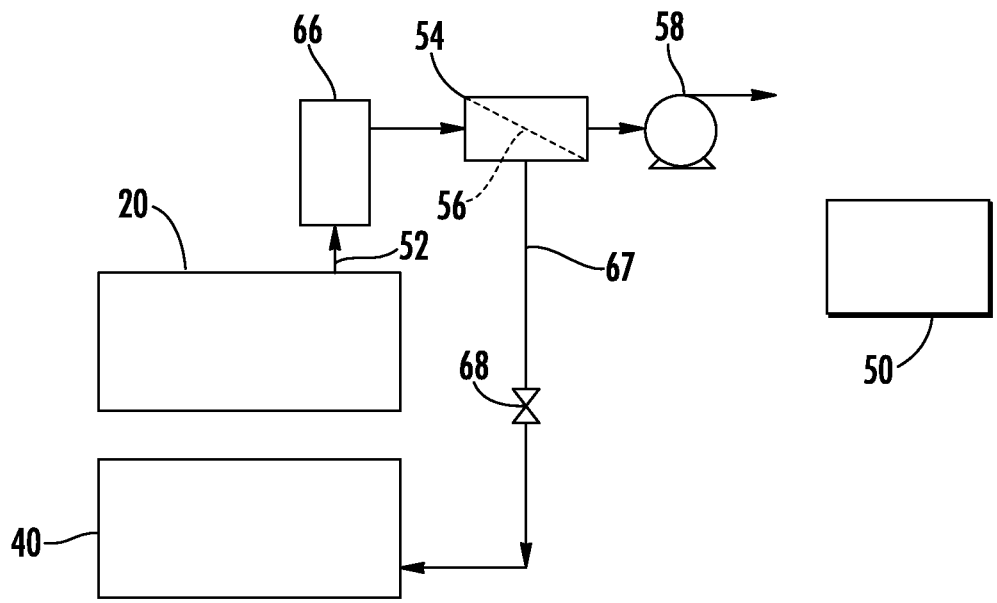
FIG. 4 is schematic depiction of an example embodiment of a purge system and relevant components of a vapor compression heat transfer refrigerant fluid circulation loop, with membrane unit retentate directed to the system evaporator.

In some embodiments, refrigerant from the first side of membrane 56 can be returned to the refrigerant fluid circulation loop. As shown in FIG. 4, a connection 67 returns retentate gas from the first side of membrane 56 to the refrigerant fluid circulation loop at the evaporator 40, through a control device such as expansion valve 68 utilized to accommodate the pressure differential between the first side of the membrane 56 (which is close to the pressure at the condenser 20) and pressure at the evaporator 40. It should be noted that the control device can control either or both flow through or pressure drop across the control device, and expansion valve 68 is shown as an integrated control device unit that performs both functions for ease of illustration, but could be separate components such as a control valve and an expansion orifice. In some embodiments, utilization of a bypass refrigerant return can provide a technical effect of promoting greater concentrations of contaminants at the first side of membrane 56 by removing gas at the membrane 56 that is concentrated with refrigerant after removal of contaminant gas molecules through the membrane 56, so that refrigerant-concentrated gas can be displaced with gas from the purge collector 66 that has a higher concentration of contaminants. The bypass 67 can also include a control or shut-off valve, which can be integrated with an expansion device (i.e., an expansion valve), as described in more detail in U.S. patent application Ser. No. 62/584,012, the disclosure of which is incorporated herein by reference in its entirety. In alternative embodiments (not shown), the bypass conduit 67 can return refrigerant-laden gas to a colder side of the condenser 20 or inlet of the compressor 10, in which case an expansion device may not be needed due to lower pressure differential compared to that of a bypass return to the evaporator 40. In such as case, the connection 67 can utilize a control device such as a control or shut-off valve 69 that does not provide gas expansion.

Figure 5:
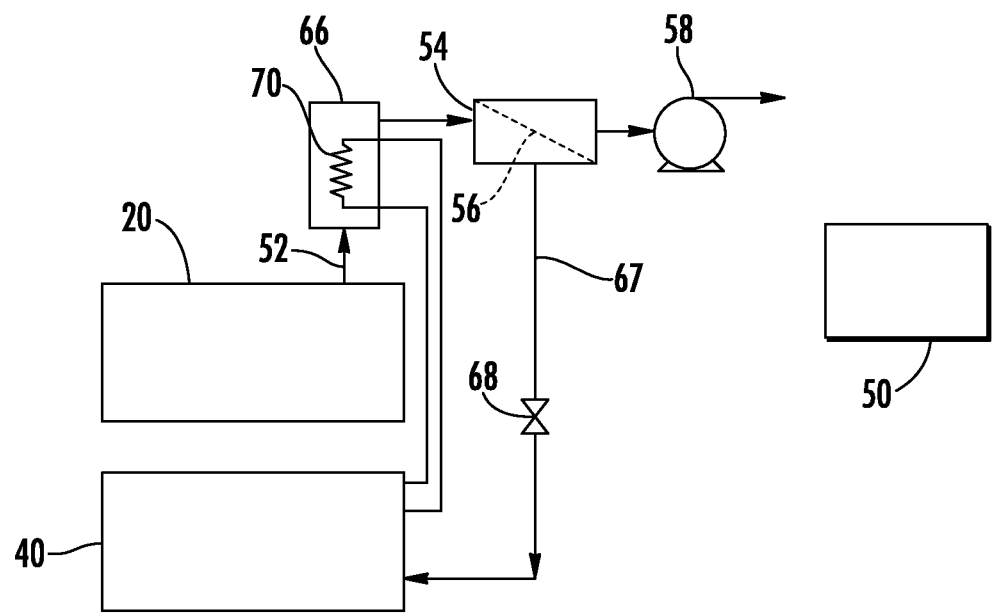
FIG. 5 is schematic depiction of another example embodiment of a purge system and relevant components of a vapor compression heat transfer refrigerant fluid circulation loop, with a cooling element in a purge collector.
Figure 6:
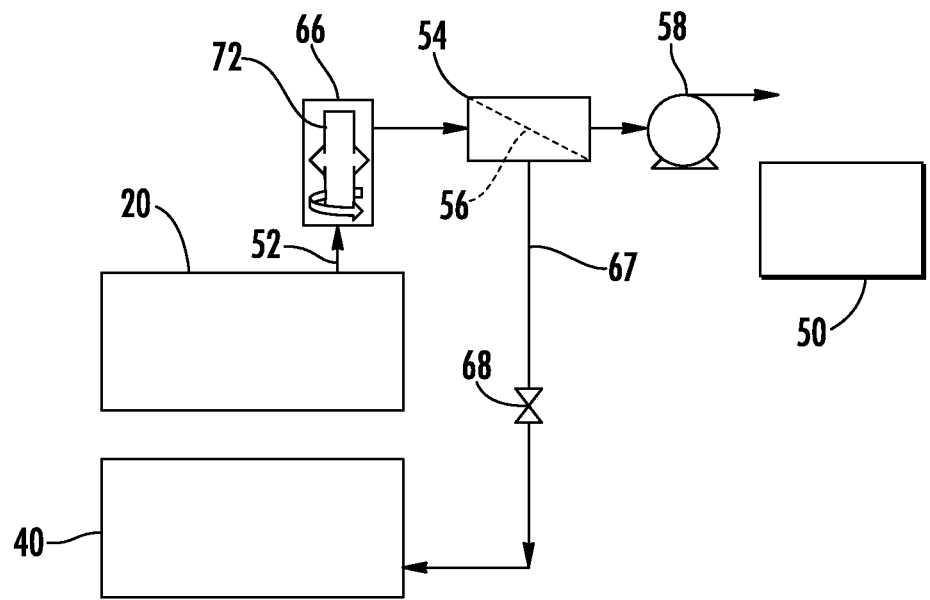
FIG. 6 is schematic depiction of another example embodiment of a purge system and relevant components of a vapor compression heat transfer refrigerant fluid circulation loop, with a centrifugal separator.

As discussed above, in some embodiments gas stratification in the purge collector 66 can provide a technical effect of promoting higher concentrations of contaminants at the first side of the membrane 56, which in turn can promote more effective mass transfer to the membrane and more effective separation. FIGS. 5 and 6 show schematic depictions of embodiments that can promote stratification and/or delivery of higher concentrations of contaminants to the membrane 56. As shown in FIG. 5, a cooling element such as a heat exchange coil loop 70 in fluid communication with cold refrigerant from the evaporator can be disposed in the purge collector 66 to promote stratification through thermally-induced densification of refrigerant gas and/or through condensation of refrigerant gas. As shown in FIG. 6, a centrifugal separator 72 can promote stratification in the purge collector 66 by directing relatively dense refrigerant gas radially outward (from where it can be directed downward or back to the refrigerant fluid flow loop) while relatively less dense contaminant gases can flow upward through the purge collector 66 and on to the membrane separator 54. Centrifugal separators can utilize a vortex-inducing blade or other assembly at an upstream of the separator and components (e.g., walls and channels) disposed radially outward for collecting separated gas of higher density.

Figure 7:
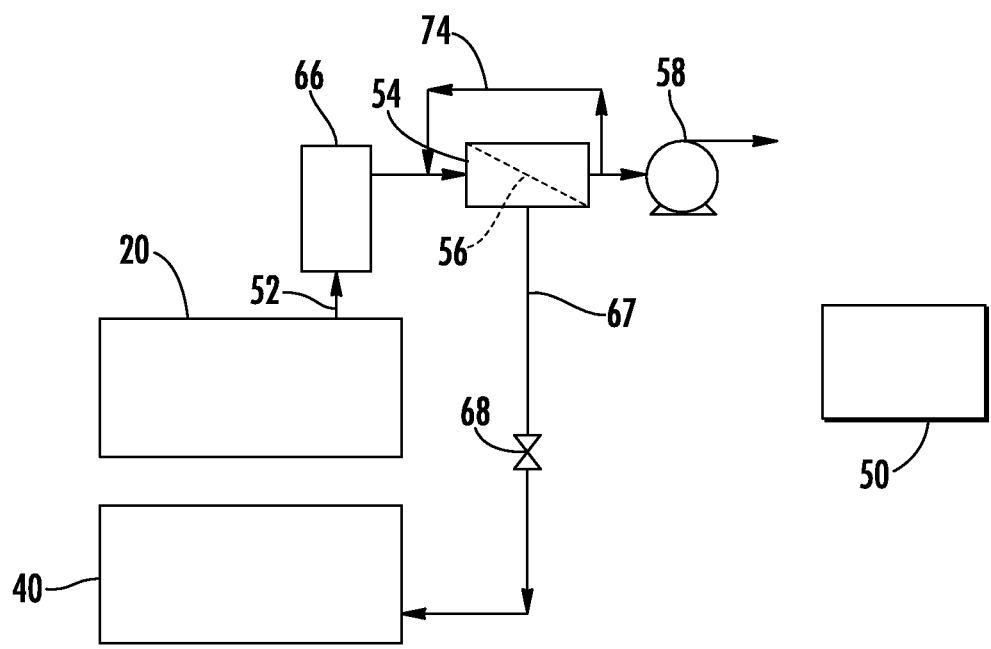
FIG. 7 is schematic depiction of another example embodiment of a purge system and relevant components of a vapor compression heat transfer refrigerant fluid circulation loop, with a permeate recycle.

In another example embodiment that can promote a higher relative concentration of contaminants at the first side of the membrane 56, FIG. 7 shows a permeate recycle 74 that directs a portion of the contaminants on the second side of the membrane 56 back to the first side of the membrane. Recycle 74 can include a conduit with a pump (e.g., a Venturi-style pump using pressurized fluid from the refrigerant fluid flow loop or a small mechanical pump).

Figure 8:
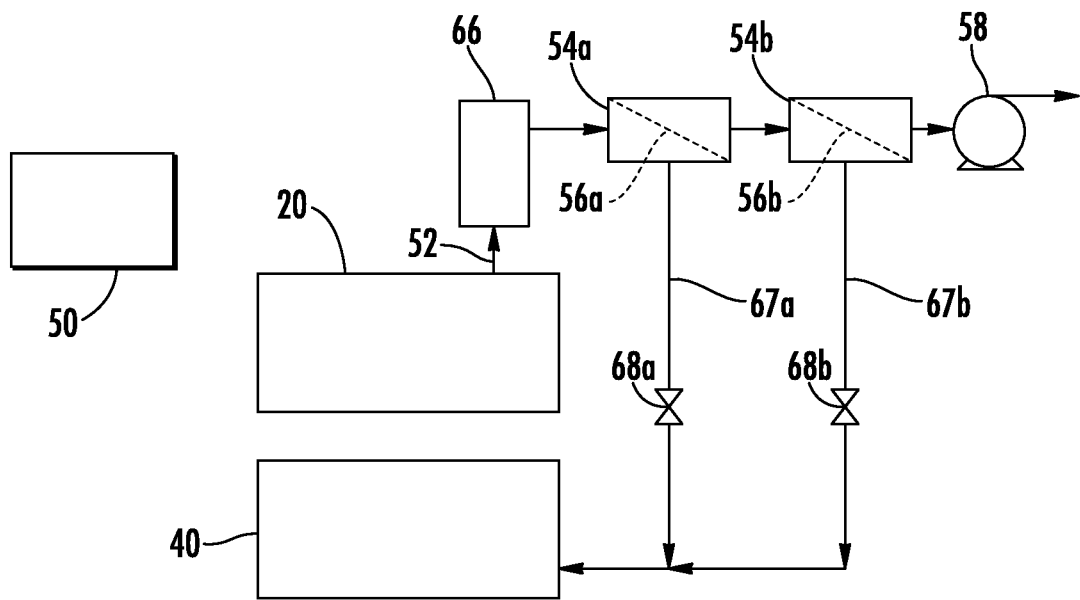
FIG. 8 is a schematic depiction of another example embodiment of a purge system and relevant components of a vapor compression heat transfer refrigerant fluid circulation loop, with membrane units in a cascade configuration.

The above embodiments are examples of specific embodiments, and other variations and modifications may be made. For example, a single membrane is depicted for ease of illustration in the above-discussed Figures. However, multiple membranes (or membrane separation units) can be utilized, either in cascaded or parallel configurations. An example embodiment of a cascaded configuration is schematically depicted in FIG. 8. As shown in FIG. 8, membrane separation units 54a and 54b (with membranes 56a and 56b) are disposed in a cascaded configuration in which permeate from the separation unit 54a is fed to the first side of the second separation unit 54b. Retentate from the first side of the membranes 56a and 56b is routed through connections 67a and 67b to the refrigerant fluid circulation loop at the evaporator 40, with expansion devices 68a and 68b utilized to accommodate the pressure differential between the first side of membranes 56a and 56b (which is close to the pressure at the condenser 20) and pressure at the evaporator 40. Other variations for protection of the membrane through a polymer layer or regenerative back-flush or heating cycles are disclosed in U.S. patent application Ser. No. 62/584,073, the disclosure of which is incorporated herein by reference in its entirety.

Figure 9:
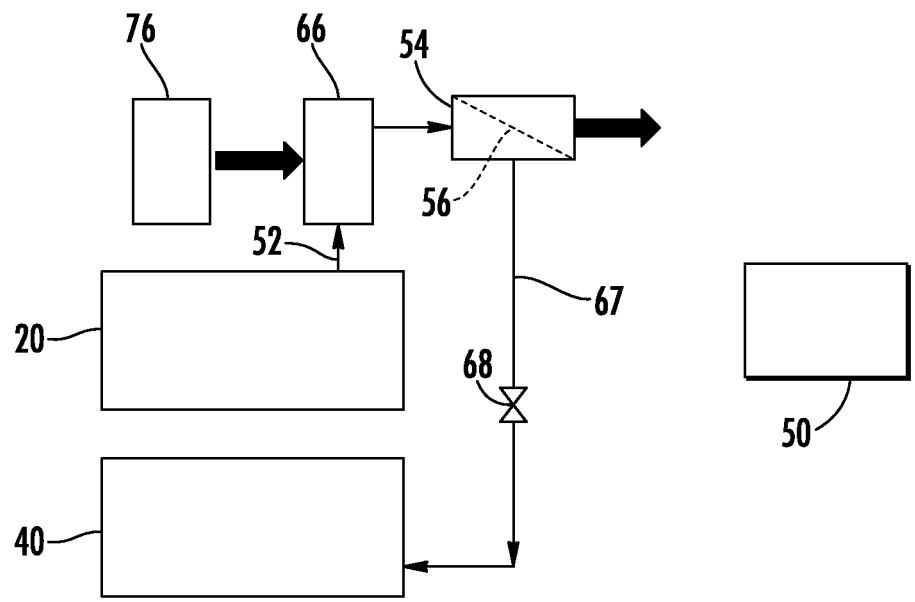
FIG. 9 is a schematic depiction of another example embodiment of a purge system and relevant components of a vapor compression heat transfer refrigerant fluid circulation loop, with a thermal prime mover.

Other system variations can involve the prime mover. The above-discussed example embodiments utilize a vacuum pump in communication with the permeate side of the membrane, but other prime movers can be utilized. As an alternative to mechanical vacuum pumps such as a vane pump or reciprocating piston pump, Venturi-style pumps can be used in which a flowing fluid (e.g., refrigerant flowing through the refrigerant fluid flow loop is routed through a Venturi device in fluid communication with the permeate side of the membrane to draw a vacuum on the permeate side of the membrane. Another example embodiment of a prime mover is shown in FIG. 9, in which a heat source 76 can be activated to heat the gas in the purge collector 66 in conjunction with isolating the purge collector from the condenser, such as with a shut-off valve or check-valve to cause thermal expansion and thereby provide motive force to drive gas to and through the membrane 56. The heat source 76 (or a different heat source) can also be used to control the membrane temperature during operation to achieve target membrane performance characteristics, or to heat the membrane for membrane regeneration.

As mentioned above, the system includes a controller such as controller 50 for controlling the operation of the heat transfer refrigerant flow loop and the purge system. A refrigeration or chiller system controller can operate the refrigerant heat transfer flow loop in response to a cooling demand signal, which can be generated externally to the system by a master controller or can be entered by a human operator. Some systems can be configured to operate the flow loop continuously for extended periods. The controller is configured to also operate the control device in the retentate return conduit, or the prime mover, or both the control device and the prime mover, in response to a purge signal. The purge signal can be generated from various criteria. In some embodiments, the purge signal can be in response to elapse of a predetermined amount of time (e.g., simple passage of time, or tracked operating hours) tracked by the controller circuitry. In some embodiments, the purge signal can be in response to human operator input. In some embodiments, the purge signal can be in response to measured parameters of the refrigerant fluid flow loop, such as a pressure sensor.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigeration system comprising:
   a heat transfer fluid circulation loop configured to allow a refrigerant to circulate therethrough;
   a purge gas outlet in operable communication with the heat transfer fluid circulation loop;
   at least one gas permeable membrane having a first side in operable communication with the purge gas outlet and a second side, said membrane comprising a porous inorganic material with pores of a size to allow passage of contaminants through the membrane and restrict passage of the refrigerant through the membrane;
   a permeate outlet in operable communication with the second side of the membrane; and
   a heat source in controllable thermal communication with the membrane.

2. The refrigeration system of claim 1, further comprising a prime mover operably coupled to the permeate outlet, the prime mover configured to move gas from the second side of the membrane to an exhaust port leading outside the fluid circulation loop.

3. The refrigeration system of claim 1, wherein the heat transfer fluid circulation loop comprises a compressor, a heat rejection heat exchanger, an expansion device, and a heat absorption heat exchanger, connected together in order by conduit;
   wherein the purge gas outlet is in operable communication with at least one of the heat rejection heat exchanger, the heat absorption heat exchanger and the membrane.

4. The refrigeration system of claim 1, further comprising a retentate return conduit operably coupling the first side of the membrane to the fluid circulation loop.

5. The refrigeration system of claim 2, wherein the prime mover comprises a vacuum pump.

6. The refrigeration system of claim 1, further comprising a purge gas collector operably coupled to the purge outlet and the membrane.

7. The refrigeration system of claim 6, wherein the purge gas collector comprises purge gas therein comprising refrigerant gas and contaminants, said purge gas in a stratified configuration with a higher concentration of refrigerant toward the purge outlet and a higher concentration of contaminants toward the membrane.

8. The refrigeration system of claim 6, further comprising a chiller coil disposed in the purge gas collector, the coil in operable communication with the fluid circulation loop.

9. The refrigeration system of claim 6, wherein the heat source is further in controllable thermal communication with the purge gas collector.

10. The refrigeration system of claim 1, wherein the membrane comprises a ceramic.

11. The refrigeration system of claim 1, wherein the at least one gas permeable membrane comprises a plurality of gas permeable membranes; wherein the plurality of gas permeable membranes are arranged in serial or parallel communication.

12. A refrigeration system, comprising:
    a heat transfer fluid circulation loop configured to allow a refrigerant to circulate therethrough;

a purge gas outlet in operable communication with the heat transfer fluid circulation loop;

at least one gas permeable membrane having a first side in operable communication with the purge gas outlet and a second side, said membrane comprising a porous inorganic material with pores of a size to allow passage of contaminants through the membrane and restrict passage of the refrigerant through the membrane;

a permeate outlet in operable communication with the second side of the membrane;

a first prime mover operably coupled to the permeate outlet, the prime mover configured to move gas from the second side of the membrane to an exhaust port leading outside the fluid circulation loop; and a second prime mover configured to move permeate from the second side of the membrane to the first side of the membrane.

13. The refrigeration system of claim 1, further comprising a filter or a vortex separator between the purge outlet and the membrane.

14. A refrigeration system, comprising:

a heat transfer fluid circulation loop configured to allow a refrigerant to circulate therethrough;

a purge gas outlet in operable communication with the heat transfer fluid circulation loop;

at least one gas permeable membrane having a first side in operable communication with the purge gas outlet and a second side, said membrane comprising a porous inorganic material with pores of a size to allow passage of contaminants through the membrane and restrict passage of the refrigerant through the membrane;

a permeate outlet in operable communication with the second side of the membrane;

a prime mover operably coupled to the permeate outlet, the prime mover configured to move gas from the second side of the membrane to an exhaust port leading outside the fluid circulation loop; and a controller configured to operate fluid circulation loop in response to a cooling demand signal and to operate the prime mover in response to a determination of contaminants in the fluid circulation loop.

15. A method of operating the refrigeration system of claim 14, comprising circulating a refrigerant through the heat transfer fluid circulation loop in response to a cooling demand signal, said fluid circulation loop comprising a compressor, a heat rejection side of a first heat exchanger, an expansion device, and the heat absorption side of a second heat exchanger, connected together in order by conduit under conditions in which the refrigerant is at a pressure less than atmospheric pressure in at least a portion of the fluid circulation loop;

collecting purge gas comprising contaminants from the purge gas outlet; and transferring the contaminants across the permeable membrane with the prime mover.

16. The method of claim 15, further comprising collecting the purge gas in a purge gas collector between the purge gas outlet and the membrane.

17. The method of claim 16, further comprising stratifying purge gas in the purge gas collector with a higher concentration of refrigerant toward the purge gas outlet and a higher concentration of contaminants toward the membrane.

18. The method of claim 15, further comprising returning refrigerant from the first side of the membrane to the fluid circulation loop.

* * * * *